3,793,405
IMPACT RESISTANT ACRYLATE RESIN COMPOSITIONS HAVING IMPROVED AGING RESISTANCE

Manfred Munzer, Bensheim, and Adolf Wohnhas, Darmstadt-Arheilgen, Germany, assignors to Rohm G.m.b.H., Darmstadt, Germany
No Drawing. Filed Sept. 27, 1971, Ser. No. 184,233
Claims priority, application Germany, Oct. 7, 1970, P 20 49 267.5
Int. Cl. C08f 1/80, 29/38
U.S. Cl. 260—881                8 Claims

ABSTRACT OF THE DISCLOSURE

Impact resistant acrylate resin compositions which are graft copolymers comprising a backbone copolymer of (1) acrylonitrile and/or methacrylonitrile and (2) methyl acrylate and/or ethyl acrylate, and a grafted copolymer phase comprising (1) an acrylate of a $C_1$–$C_4$ alcohol and (2) acrylonitrile and/or methacrylonitrile. Method of making the same.

---

The present invention relates to impact resistant acrylate resin compositions having improved resistance to aging, and to methods of making the same.

Impact resistant resin compositions have been used in the prior art in considerable quantity for the manufacture, by thermoplastic forming, of bottles, containers, and films for food packaging. In resins used for this purpose, emphasis is placed not only on sufficient toughness and hardness, but also on a small permeability to gases in order, for example, to prevent the loss of carbon dioxide from carbonated beverages and, particularly, to prevent penetration by atmospheric oxygen, which influences taste. A majority of the known impact-resistant resin compositions are unsatisfactory from the standpoint of gas permeability.

U.S. Pat. 3,426,102 describes impact resistant thermoplastic resin compositions which are prepared by the graft copolymerization of a mixture of unsaturated nitriles, such as acrylonitrile or methacrylonitrile, and unsaturated esters, particularly esters of acrylic acid or methacrylic acid, onto a butadiene latex as the backbone polymer. These resin masses have a good gas impermeability, particularly for oxygen. Their disadvantage, however, is a lack of resistance to aging, which is common to practically all products comprising diene latices. High-energy radiation, which is commonly employed for the sterilization of wares contained in packages made from such resin materials, accelerates this aging. Thus, mechanical properties such as hardness and extensibility decrease in such packages used to store food products over long periods of time, and do so particularly in an undesirable degree if the packages are subjected to the influence of heat and/or sunlight.

The impact resistant thermoplastic resin compositions according to the present invention have a good impermeability to oxygen and other gases and are considerably superior to the aforementioned resin materials of the prior art with regard to their resistance to aging. The present compositions, as do a majority of the impact-resistant molding resins, comprise a hard and a soft phase in which the soft phase is finely dispersed in the continuous hard phase. The new compositions comprise a graft copolymer of:

(A) 60 to 95 parts by weight of a backbone copolymer forming the hard phase and having an average molecular weight from 50000 to 300000 (corresponding with a reduced viscosity $\eta_{Sp/c}=0.05$ to 0.20 l./g. measured in dimethyl formamide at 20° C.), said backbone polymer comprising (1) 70 to 90 mol percent (of the copolymer) of acrylonitrile, methacrylonitrile, or a mixture of acrylonitrile and methacrylonitrile; (2) 30–10 mol percent of methyl acrylate or ethyl acrylate, or of a mixture of these esters with each other, (3) 0–15 mol percent of methacrylic acid esters having from 1 to 4 carbon atoms in the alcohol portion thereof; and (4) 0–10 mol percent of other copolymerizable ethylenically unsaturated monomers; and (B) as the soft or grafted phase, 40 to 5 parts by weight of a mixture comprising (1) 70–90 pecent, by weight of the mixture, of acrylic acid esters having from 1 to 4 carbon atoms in the alcohol portion; (2) 30–10 percent by weight of acrylonitrile, methacrylonitrile, or mixtures thereof; and (3) 0–20 percent by weight of further copolymerizable ethylenically unsaturated monomers.

Graft copolymers of a similar composition are described in U.S. Pat. 3,351,602. However, they are prepared in the absence of a molecular weight regulator and, because of their high molecular weight or because of the presence of polyfunctional monomers therein, are insoluble in organic solvents and cannot be thermoplastically worked. The backbone polymers described in this patent do not have a molecular weight within the range disclosed in the present application. Because of the lack of workability in a thermoplastic condition, the use of these polymers is limited to the preparation of coatings, binders, and impregnating agents.

In contrast, in the preparation of the backbone polymer which is basic to the resin compositions of the present invention, the degree of polymerization is so adjusted according to known methods that an average molecular weight in the region from 50000 to 300000, preferably up to 200000, results, corresponding to a reduced viscosity of $\eta_{Sp/c}=0.05$ to 0.20 l./g., or 0.05 to 0.15 l./g. for the preferred region. For a degree of polymerization of this order of magnitude, the graft-copolymeric resin compositions prepared therefrom are, in contrast to known acrylonitrile-acrylic acid ester-polymers, still thermoplastically workable and, to the extent that the soft phase is not cross-linked, are soluble in organic solvents.

Although it is possible in principle to achieve the desired degree of polymerization of the backbone polymer by choice of the amount of initiator and the polymerization temperature, in practice the control of the degree of polymerization is effected by the addition of chain transfer agents (molecular weight regulators). In addition to halohydrocarbons, terpenes, and the like, mercaptans, particularly alkyl mercaptans and lower mercapto alkanoic acids and their esters have proved particularly useful as chain transfer agents. Mercaptans are preferably employed in the preparation of resin compositions according to the present invention. For example, octyl mercaptan, dodecyl mercaptan, and mercapto acetic acid and its esters are suitably employed. The amount of these chain transfer agents required depends on their transfer constants and is principally between 1 and 3 percent, by weight of the monomer employed. Polyfunctional sulfur containing regulators are employed to special advantage. By their use, good mechanical properties and a relatively high resistance to deformation by heat are obtained. These effects are particularly noticeable if at least tri-functional regulators are employed. Resin compositions prepared in this manner constitute the preferred embodiments of the present invention. Exemplary of such sulfur-containing polyvalent chain transfer agents are the mercapto acetic acid esters of polyols such as ethylene glycol, butylene glycol, glycerine, and penta-erythritol.

Since the efficacy of these chain transfer agents is dependent on their nature, on the composition of the monomer, and on the polymerization conditions, the amount of chain transfer agent to be employed in a particular case is usually determined in advance by simple tests for the purpose of orientation. Resins comprising a backbone polymer of a molecular weight of more than 300,000 have good mechanical properties but are processed in the thermoplastic state only with difficulties. Compositions comprising a backbone polymer having a molecular weight below the region taught herein to be of interest show a decrease in mechanical properties, above all in impact resistance and notched impact resistance. In contrast, within the molecular weight region specified, there are no significant differences in these properties.

By variation in the combination of monomers used, the properties of the resin compositions can be varied. Thus, the softening temperature and water resistance are slightly improved by incorporating methacrylonitrile instead of acrylonitrile into the resin; but since methacrylonitrile tends to reduce the rate of polymerization, it is preferably not employed in amounts of more than 50 mol percent of the nitrile component in either phase. The hardness and the softening temperature of the resin compositions according to the invention increase with an increasing proportion therein of such monomers which form hard homopolymers. Simultaneously, the impact resistance and notched impact resistance decrease. Thus, if acrylonitrile or methacrylonitrile, which strongly impart hardness to the product, are used in high proportion in forming the backbone polymer, only methyl acrylate and/or ethyl acrylate are employed as comonomers in order to provide sufficient impact resistance. If, however, high hardness and high resistance to deformation by heat (at the cost of impact resistance) are required, methacrylic acid esters having from 1 to 4 carbon atoms in the alcohol portion thereof (or any other comonomer imparting hardness) may be employed in addition to acrylonitrile or methacrylonitrile. In the latter case—i.e., if a relatively high proportion of a nitrile is employed—compatability of the soft phase with the hard phase is improved by the use of a limited amount (i.e. at most 30 percent by weight) of acrylonitrile or methacrylonitrile in the soft phase. The highest values in impact resistance and notched impact resistance are obtained when only methyl acrylate or ethyl acrylate are employed in combination with the least permissible amount of acrylonitrile and/or methacrylonitrile in the backbone polymer, and when the grafted phase comprises the highest permissible amount of acrylic acid esters having three or four carbon atoms in the alcohol portion thereof. (Products of this sort have a very low resistance to deformation by heat.) Butyl acrylate is the preferred monomer for the grafting phase.

A number of additional, different, ethylenically unsaturated monomers can be present in minor amounts in the backbone polymer as well as in the grafted branches, primarily for modification of the properties discussed above. Typical of such further monomers are: styrene; vinyl toluene; α-methyl styrene; vinyl esters and vinyl ethers; vinyl chloride; vinylidene chloride; vinyl pyrrolidone; vinyl imidazole; acrylamide and methacrylamide; methacrylic acid esters and higher acrylic acid esters; monoesters formed between methacrylic acid or acrylic acid and polyvalent alcohols such as glycols, glycerine, or butanediol-1,4; etc. In the soft phase, ethylenically polyunsaturated monomers such as divinyl benzene, glycol diacrylate or dimethacrylate, or diallyl phthalate can be present in small amounts.

The thermoplastic resin compositions according to the present invention are preferably prepared by emulsion or suspension polymerization. Conventional initiators and the reaction conditions conventional for such polymerizations are employed. Typical preparative methods are illustrated in the following examples, but the synthesis of the polymers is not limited to these specific embodiments.

In addition to the uses in the packaging of foodstuffs as already described herein, the resin compositions of the present invention can be employed in all fields in which an impact resistant material with low permeability to gases and a good resistance to aging is desirable.

A better understanding of the present invention and of its many advantages will be had by referring to the following specific examples, given by way of illustration.

In following Examples 1–14 and comparative Examples 1 and 2, the following procedure was employed. 75 g. of a partially hydrolyzed polyvinyl acetate ("Mowiol N 70–88"), are dissolved in 45 liters of deionized water in a heatable 100 liter vessel equipped with a stirrer. Air is displaced by nitrogen and the solution is warmed to 75° C. At this temperature, a first monomer phase (for formation of the hard phase or backbone polymer), comprising a monomer mixture and chain transfer agent as given in following Table I, together with 0.5 percent (by weight of the monomers) of azo isobutylronitrile (AIBN) as an initiator, is added and dispersed. Because of the heat of polymerization, the interior temperature of the vessel reaches a temperature maximum about 1 hour after addition of the monomer phase.

Fifteen minutes after this maximum temperature is reached, the molecular weight of the backbone polymer is determined from a test sample and immediately thereafter a second monomer phase (for formation of the soft or grafting phase) is added. This phase contains, in addition to the monomers reported in the following Table, 0.5 percent AIBN (calculated on the weight of the monomers in this phase). The total weight of the two monomer phases is 15 kg. The ratio by weight of the two phases is evident from the table.

Polymerization is continued for 30 minutes at 75° C. to 80° C., and for one hour at 90° C. Subsequently, the mixture is cooled to 30° C.–40° C. The resultant pearl polymer is separated by suction filtration in a yield of 98 percent, washed with deionized water, and dried.

The dried pearl polymer is then formed by injection molding into test bars and Vicat plates using a Battenfeld injection molding machine BSM 10 at cylinder temperatures between 180° C. and 200° C. Formed parts which are transparent and of a pale yellow color, and which have a good luster, are obtained.

In a departure from these conditions, the resin composition of Example 3 was injection molded at a temperature of 220° C., which resulted in a noticeably stronger coloration.

The thermoplastic resin composition prepared according to comparison Example 2, which composition is outside the scope of the present claims, has flow properties which are insufficient for the preparation of defect-free test samples even at this elevated temperature.

Measurement of the impact resistance and notched impact resistance were carried out on the standard bar samples according to DIN 53453. Measurement of the Vicat softening temperature is made according to DIN 53460 (method B, in air).

TABLE I

| Ex. | Weight ratio | | Composition of the hard phase (percent by wt.) | | | | | | Properties of the hard phase | | Composition of the soft phase (wt. percent) | | | Properties of the graft copolymer | | Softening temp. Vicat (° C.) |
|---|---|---|---|---|---|---|---|---|---|---|---|---|---|---|---|---|
| | Hard phase | Soft phase | AN | MA | EA | MMA | PTT | DM | Red. visc. ($\eta$), l./g. | Mol. wt. | BA | AN | BDMA | Impact resistance (cm.-kg./cm.²) | Notched impact resistance (cm.-kg./cm.²) | |
| 1 | 70 | 30 | 70 | 30 | | | 2.0 | | 0.058 | 60,000 | 80 | 20 | | (¹) | 8.5 | 85 |
| 2 | 70 | 30 | 70 | 30 | | | 1.0 | | 0.11 | 140,000 | 80 | 20 | | 66 | 14 | 85 |
| 3 | 70 | 30 | 70 | 30 | | | 0.7 | | 0.17 | 250,000 | 80 | 20 | | 79 | 10 | 85 |
| 4 | 70 | 30 | 70 | 30 | | | 2.0 | | 0.058 | 60,000 | 80 | 19.6 | 0.4 | 53 | 4.8 | 85 |
| 5 | 80 | 20 | 70 | 20 | | 10 | 2.0 | | 0.059 | 61,000 | 80 | 20 | | 55 | 4.6 | 92 |
| 6 | 90 | 10 | 70 | 30 | | | 2.0 | | 0.058 | 60,000 | 80 | 20 | | 45 | 3.4 | 89 |
| 7 | 70 | 30 | 70 | | 15 | 15 | 1.5 | | 0.115 | 150,000 | 80 | 20 | | 59 | 9.4 | 80 |
| 8 | 70 | 30 | 75 | 25 | | | 2.0 | | 0.062 | 65,000 | 80 | 20 | | (¹) | 5.4 | 87 |
| 9 | 70 | 30 | 70 | 30 | | | | 1.0 | 0.068 | 75,000 | 80 | 20 | | 68 | 6.9 | 81 |
| Comp. ex. 1 | 70 | 30 | 70 | 30 | | | 2.5 | | 0.047 | 45,000 | 80 | 20 | | 19 | 3.1 | 84 |
| 2 | 70 | 30 | 70 | 30 | | | 0.5 | | 0.24 | 440,000 | 80 | 20 | | | | |

¹ No break under test conditions.

NOTE.—AN=Acrylonitrile; MA=Methyl acrylate; EA=Ethyl acrylate; BA=n-butylacrylate; MMA=Methylmethacrylate; BDMA=1,4-butyleneglycol dimethacrylate; PTT=Pentaerythritol tetrathioglycolate; DM=n-dodecyl mercaptan.

TABLE II

| Ex. | Weight ratio | | Composition of the hard phase (percent by wt.) | | | | PTT | Properties of the hard phase | | Composition of the soft phase (wt. percent) | | | | Properties of the graft copolymer | | Softening temp. -Vicat (° C.) |
|---|---|---|---|---|---|---|---|---|---|---|---|---|---|---|---|---|
| | Hard phase | Soft phase | AN | MAN | MA | Other | | Red. visc. ($\eta$), l./g. | Mol. wt. | BA | AN | MAN | Other | Impact resistance (cm.-kg./cm.²) | Notched impact resistance (cm.-kg./cm.²) | |
| 10 | 70 | 30 | 50 | 30 | 20 | | 1 | 0.059 | 61,000 | 80 | 20 | | | 55 | 3.0 | 96 |
| 11 | 70 | 30 | 70 | | 30 | | 2 | 0.060 | 62,000 | 40 | 20 | | ¹ 40 | 68 | 3.5 | 86 |
| 12 | 70 | 30 | 70 | | 23 | ² 7 | 2 | 0.058 | 60,000 | 80 | 10 | 10 | | 46 | 3.1 | 90 |
| 13 | 70 | 30 | 70 | | | ³ 10 ¹ 20 | 2 | 0.063 | 65,000 | 80 | 20 | | | (⁴) | 8.9 | 79 |
| 14 | 70 | 30 | 70 | | 30 | | 2 | 0.059 | 61,000 | 67 | 20 | | ² 13 | 45 | 2.5 | 86 |

¹ Ethyl acrylate.
² Styrene.
³ Butyl methacrylate.
⁴ No break under test conditions.

NOTE.—AN=Acrylonitrile; MAN=Methacrylonitrile; MA=Methyl acrylate; PTT=Pentaerythritol tetrathioglycolate; BA=nebutylacrylate.

What is claimed is:

1. An impact resistant resin composition which is a graft copolymer of:
    (A) 60 to 95 parts by weight of a backbone copolymer phase having an average molecular weight between 50,000 and 300,000 and comprising (1) 70 to 90 mol percent, of the backbone copolymer phase, of a member selected from the group consisting of acrylonitrile, methacrylonitrile, and mixtures thereof; (2) 30 to 10 mol percent of a member selected from the group consisting of methyl acrylate, ethyl acrylate, and mixtures thereof; (3) 0 to 15 mol percent of at least one methacrylic acid ester having from 1 to 4 carbon atoms in the alcohol portion thereof; and (4) 0 to 10 mol percent of at least one other copolymerizable ethylenically unsaturated monomer; and
    (B) 40 to 5 parts by weight of a grafted copolymer phase prepared by graft copolymerizing onto said backbone copolymer a mixture comprising (1) 70 to 90 percent, by weight of the grafted copolymer phase, of at least one acrylic acid ester having from 1 to 4 carbon atoms in the alcohol portion thereof; (2) 30 to 10 percent by weight of a member selected from the group consisting of acrylonitrile and methacrylonitrile; and (3) 0 to 20 percent by weight of at least one other copolymerizable ethylenically unsaturated monomer.

2. A resin composition as in claim 1 wherein said backbone copolymer has an average molecular weight between 50,000 and 200,000.

3. A resin composition as in claim 1 wherein said backbone copolymer comprises acrylonitrile and methyl acrylate.

4. A resin composition as in claim 1 wherein said grafted copolymer comprises n-butyl acrylate and acrylonitrile.

5. A resin composition as in claim 1 wherein said backbone copolymer comprises acrylonitrile and methyl acrylate and said grafted copolymer comprises n-butyl acrylate and acrylonitrile.

6. In the method of making a graft copolymer by first preparing
    (A) a backbone copolymer by the emulsion or suspension polymerization, in the presence of a free radical initiator, of (1) 70 to 90 mol percent, of the backbone copolymer phase, of a member selected from the group consisting of acrylonitrile, methacrylonitrile, and mixtures thereof; (2) 30 to 10 mol percent of a member selected from the group consisting of methyl acrylate, ethyl acrylate, and mixtures thereof; (3) 0 to 15 mol percent of at least one methacrylic acid ester having from 1 to 4 carbon atoms in the alcohol portion thereof; and (4) 0 to 10 mol percent of at least one other copolymerizable ethylenically unsaturated monomer; and then graft copolymerizing onto 60 to 95 parts by weight of said backbone copolymer, and in the presence of a free radical initiator, 40 to 5 parts by weight of
    (B) a mixture of (1) 70 to 90 percent, by weight of said mixture, of at least one acrylic acid ester having from 1 to 4 carbon atoms in the alcohol portion thereof; (2) 30 to 10 percent by weight of a member selected from the group consisting of acrylonitrile and methacrylonitrile; and (3) 0 to 20 percent by weight of at least one other copolymerizable ethylenically unsaturated monomer, the improvement wherein the backbone copolymer is polymerized in the presence of a chain transfer agent having a plurality of mercapto groups to form a backbone copolymer having an average molecular weight between 50,000 and 300,000, whereby an impact-resistant resin is obtained.

7. The method as in claim 6 wherein said chain transfer agent has at least three mercapto groups.

8. The method as in claim 6 wherein said chain transfer agent is a polymercaptoacetic acid ester of a polyol.

References Cited

UNITED STATES PATENTS 3,144,422   8/1964   Homberg _____ 260—45.85 H
3,257,340   6/1966   Osmond _____ 260—881
3,351,602   11/1967  Dunnavant et al. ____ 260—881

MURRAY TILLMAN, Primary Examiner

J. ZIEGLER, Assistant Examiner

U.S. Cl. X.R.

161—247; 260—873, 883